(No Model.)
C. J. HIRLIMANN.
GALVANIC BATTERY.
No. 407,931. Patented July 30, 1889.
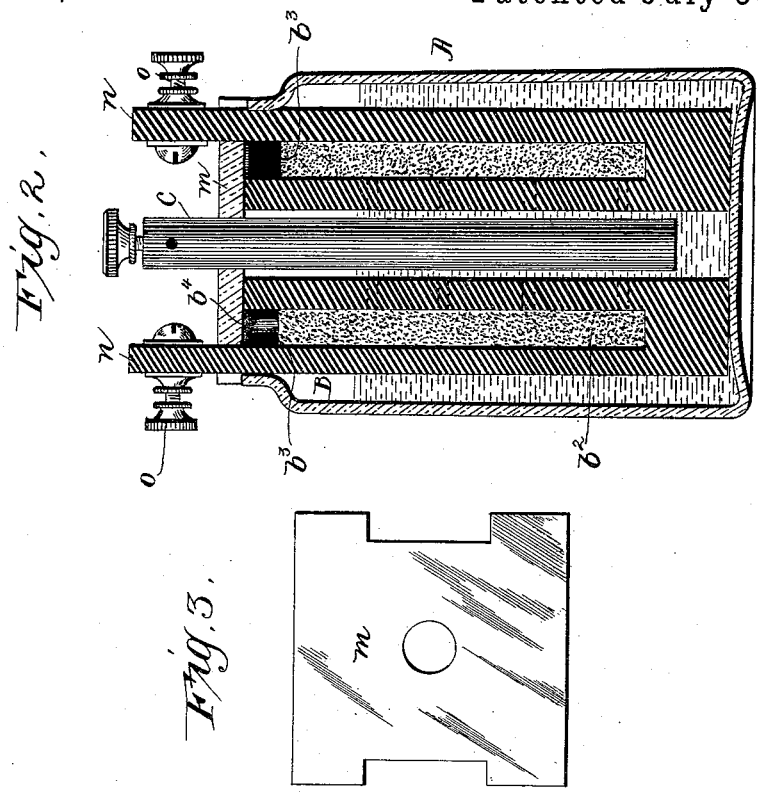
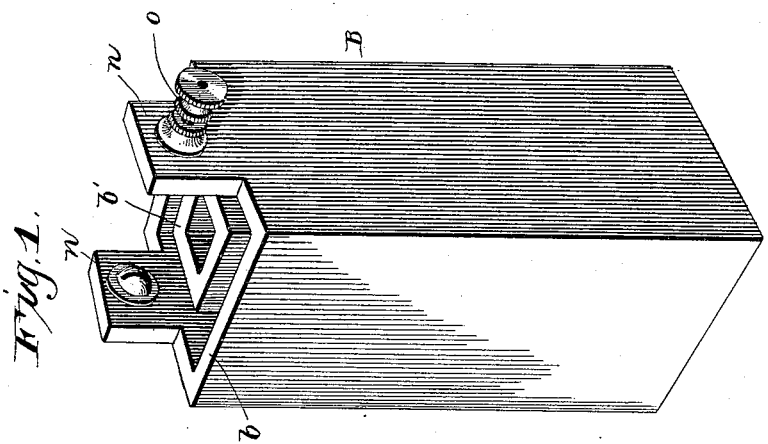
WITNESSES:
INVENTOR
Charles J. Hirlimann
BY
ATTORNEY

UNITED STATES PATENT OFFICE.

CHARLES J. HIRLIMANN, OF FORT LEE, NEW JERSEY.

GALVANIC BATTERY.

SPECIFICATION forming part of Letters Patent No. 407,931, dated July 30, 1889.

Application filed May 6, 1889. Serial No. 309,695. (No model.)

*To all whom it may concern:*

Be it known that I, CHARLES J. HIRLIMANN, a citizen of the United States, residing in Fort Lee, in the county of Bergen and State of New Jersey, have invented certain new and useful Improvements in Galvanic Batteries, of which the following is a specification.

My invention relates to galvanic batteries, the object being to provide a cheap and efficient carbon battery.

In general terms, the invention consists of two carbon boxes or rectangular structures, one placed within the other, and the two being joined together at one end, thus forming a chamber or receptacle between the outer and inner boxes. A free passage is left through the inner box. The outer box is formed with two ears projecting above the mouth of the jar or cell, in which are fitted binding-posts for making connections. Any usual depolarizing agent is placed in the chamber between the two boxes and sealed in by wax or in any other suitable manner. The whole is then placed in a suitable jar, preferably rectangular in shape, and containing the electrolyte.

Referring to the accompanying drawings, Figure 1 represents a perspective view of the carbon boxes. Fig. 2 represents a central section of a complete cell, and Fig. 3 represents a plan of the cover used for sealing the cell.

The containing-jar is represented by A.

B represents the carbon element of the battery. It consists of two rectangular carbon boxes $b$ and $b'$. These boxes are placed one within the other, and are joined together at the bottom, as shown in Fig. 2, thus forming a receptacle $b^2$ between the walls of the two boxes. In this receptacle I place any suitable depolarizing agent. This depolarizing material is sealed in by means of a layer of wax or paraffine, (represented by $b^3$.) Air-holes $b^4$ through the wax may be provided, if desired. The chamber inclosed by the inner box is open at both ends, and is adapted to receive the zinc pencil C. The zinc is held out of contact with the carbon by the cover $m$ of the jar, which may be of glass or any other insulating material. The inner box may also have lateral perforations, as shown.

The outer carbon box is formed with two projecting ears $n\,n$ at its upper end, in which are placed binding-posts $o\,o$. The object of two binding-posts is to enable me to keep the battery in operation while being cleaned. If the binding-post which is being used becomes corroded, connection may be made with the other and the cell maintained in operation while the defective connection is being made good.

The carbon element closely fits the mouth of the jar, and the cover $m$ is cut away, as shown, so as to embrace the ears $n\,n$ and entirely cover the cell.

Having thus described my invention, I claim—

1. In a galvanic-battery cell, a carbon element consisting of two rectangular carbon boxes, one placed within the other, and the two connected together at one end.

2. In a galvanic-battery cell, a carbon element consisting of two rectangular carbon boxes, one placed within the other, and the two connected together at one end, a free passage or chamber being provided throughout the inner box.

3. In a galvanic-battery cell, a carbon element consisting of two rectangular carbon boxes, one placed within the other, and the two connected together at one end, thus forming a chamber between the two boxes, in combination with a depolarizing agent placed within the chamber.

4. In a galvanic-battery cell, a carbon element consisting of two rectangular carbon boxes, one placed within the other, and the two connected together at one end, a free passage or chamber being provided throughout the inner box, in combination with a zinc element occupying said chamber.

5. In a galvanic battery, a carbon element having a rectangular shape, and provided with two ears extending above the mouth of the cell, in combination with an outer rectangular jar and a cover for the same, the latter having cut-away portions to accommodate the ears on the carbon element.

In witness whereof I have hereunto signed my name in the presence of two subscribing witnesses.

CHARLES J. HIRLIMANN.

Witnesses:
BENJAMIN BLUM,
THOMAS K. TRENCHARD.